US012605987B2

(12) United States Patent
Kim et al.

(10) Patent No.: US 12,605,987 B2
(45) Date of Patent: Apr. 21, 2026

(54) HEAT PUMP SYSTEM FOR VEHICLE

(71) Applicants: Hyundai Motor Company, Seoul (KR); Kia Corporation, Seoul (KR); Doowon Climate Control Co., Ltd., Asan-si (KR)

(72) Inventors: Jeawan Kim, Hwaseong-si (KR); Jae Yeon Kim, Hwaseong-si (KR); Man Hee Park, Suwon-si (KR); Chul Min Kim, Asan-si (KR)

(73) Assignees: Hyundai Motor Company, Seoul (KR); Kia Corporation, Seoul (KR); Doowon Climate Control Co., Ltd., Asan-Si (KR)

( * ) Notice: Subject to any disclaimer, the term of this patent is extended or adjusted under 35 U.S.C. 154(b) by 253 days.

(21) Appl. No.: 18/508,576

(22) Filed: Nov. 14, 2023

(65) Prior Publication Data

US 2025/0042222 A1     Feb. 6, 2025

(30)          Foreign Application Priority Data

Aug. 3, 2023     (KR) ........................ 10-2023-0101472

(51) Int. Cl.
  *B60H 1/00*          (2006.01)
  *B60H 1/32*          (2006.01)
  *F25B 43/00*        (2006.01)
(52) U.S. Cl.
  CPC ..... *B60H 1/00907* (2013.01); *B60H 1/00278* (2013.01); *B60H 1/00485* (2013.01);
                    (Continued)

(58) Field of Classification Search
  CPC ............ B60H 1/00278; B60H 1/00485; B60H 1/00907; B60H 1/3213; B60H 1/3228; F25B 43/00; F25B 2400/23
  See application file for complete search history.

(56)                References Cited

U.S. PATENT DOCUMENTS

2020/0355406 A1 *  11/2020  Umeki ...................... F25B 6/04
2022/0185067 A1     6/2022  Kim et al.

FOREIGN PATENT DOCUMENTS

KR          20200040432 A       4/2020
KR          20200130982 A       11/2020
              (Continued)

*Primary Examiner* — Jonathan Bradford
(74) *Attorney, Agent, or Firm* — Slater Matsil, LLP

(57)                ABSTRACT

An embodiment heat pump system for a vehicle includes a compressor for compressing a refrigerant, a condenser connected to the compressor, a heat exchanger connected to the condenser, a first expansion valve connected to the heat exchanger, an evaporator connected to the first expansion valve, a first refrigerant connection line having ends connected between the compressor and the evaporator and between the heat exchanger and the first expansion valve, a chiller and a second expansion valve on the first refrigerant connection line, and a gas injection device for selectively expanding and flowing the refrigerant supplied from the condenser or the heat exchanger and for selectively supplying a portion of the refrigerant to the compressor to increase a flow rate of the refrigerant, wherein the flow of the refrigerant is controlled according to a mode for controlling a temperature of a vehicle interior or a battery module.

20 Claims, 6 Drawing Sheets

(52) U.S. Cl.
CPC ......... B60H 1/3213 (2013.01); B60H 1/3228
(2019.05); F25B 43/00 (2013.01); *F25B*
*2400/23* (2013.01)

(56) References Cited

FOREIGN PATENT DOCUMENTS

| | | | |
|---|---|---|---|
| KR | 20200138455 | A | 12/2020 |
| KR | 20200143787 | A | 12/2020 |
| KR | 20220033593 | A | 3/2022 |
| KR | 20220082430 | A | 6/2022 |

* cited by examiner

HEAT PUMP SYSTEM FOR VEHICLE

CROSS-REFERENCE TO RELATED APPLICATIONS

This application claims the benefit of Korean Patent Application No. 10-2023-0101472, filed on Aug. 3, 2023, which application is hereby incorporated herein by reference.

TECHNICAL FIELD

The present invention relates to a heat pump system for a vehicle.

BACKGROUND

Generally, an air conditioning system for a vehicle includes an air conditioner unit circulating a refrigerant in order to heat or cool an interior of the vehicle.

The air conditioner unit, which is to maintain the interior of the vehicle at an appropriate temperature regardless of a change in an external temperature to maintain a comfortable interior environment, is configured to heat or cool the interior of the vehicle by heat-exchange by a condenser and an evaporator while a refrigerant discharged by driving of a compressor is circulated back to the compressor through the condenser, a receiver drier, an expansion valve, and the evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode in summer.

Meanwhile, recently, in accordance with a continuous increase in an interest in energy efficiency and an environmental pollution problem, there has been development of an environmentally friendly vehicle capable of substantially substituting for an internal combustion engine vehicle, and the environmentally friendly vehicle is generally classified into an electric vehicle driven using a fuel cell or electricity as a power source and a hybrid vehicle driven using an engine and a battery.

In the electric vehicle or the hybrid vehicle among these environmentally friendly vehicles, a separate heater is not used unlike an air conditioner of a general vehicle, and an air conditioner used in the environmentally friendly vehicle is generally called a heat pump system.

Meanwhile, in the case of an electric vehicle driven by a fuel cell as a power source, driving force is generated by converting the chemical reaction energy of oxygen and hydrogen into electrical energy. In this process, heat energy is generated by the chemical reaction within the fuel cell. Effectively removing generated heat is essential to ensuring the performance of the fuel cell.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, cooling means, a heat pump system, and a battery cooling system, respectively, should be configured as separate closed circuits so as to prevent heat generation of the motor and the battery including a fuel cell.

Therefore, a size and a weight of a cooling module disposed in front of the vehicle are increased, and a layout of connection pipes supplying a refrigerant or a coolant to each of the heat pump system, the cooling means, and the battery cooling system in an engine compartment becomes complicated.

In addition, since the battery cooling system warming up or cooling the battery according to a state of the vehicle is separately provided so that the battery exhibits optimal performance, a plurality of valves for connecting the respective connection pipes to each other are used, and noise and vibrations due to frequent opening/closing operations of these valves are transferred to the interior of the vehicle, such that a ride comfort is deteriorated.

In addition, when heating the interior of the vehicle, there are disadvantages of decreasing heating performance due to a lack of a heat source, increasing electricity consumption due to the use of an electric heater, increasing power consumption of the compressor, and the like.

The above information disclosed in this background section is only for enhancement of understanding of the background of embodiments of the invention, and therefore it may contain information that does not form the prior art that is already known to a person of ordinary skill in the art.

SUMMARY

The present invention relates to a heat pump system for a vehicle. Particular embodiments relate to a heat pump system for a vehicle capable of improving cooling and heating performance by applying a gas injection device that is selectively operated in a selected air conditioning mode of an interior of the vehicle.

Embodiments of the present disclosure provide a heat pump system for a vehicle capable of improving cooling and heating performance by applying a gas injection device selectively operating in at least one mode selected for air conditioning of an interior of a vehicle to increase a flow rate of a refrigerant.

According to an embodiment, a heat pump system for a vehicle includes a compressor compressing a refrigerant, a condenser connected to the compressor through a refrigerant line, a heat exchanger connected to the condenser through the refrigerant line and condensing or evaporating the supplied refrigerant, a first expansion valve connected to the heat exchanger through the refrigerant line, an evaporator connected to the first expansion valve through the refrigerant line, a first refrigerant connection line, one end of which is connected to the refrigerant line between the compressor and the evaporator and the other end of which is connected to the refrigerant line between the heat exchanger and the first expansion valve, a chiller provided on the first refrigerant connection line and controlling a temperature of a coolant by selectively exchanging heat between the refrigerant introduced into the first refrigerant connection line and the introduced coolant, a second expansion valve provided on the first refrigerant connection line at a front end of the chiller, and a gas injection device connected to the refrigerant line, selectively expanding and moving the refrigerant supplied from the condenser or the heat exchanger, and selectively supplying some of the supplied refrigerant to the compressor to increase a flow rate of the refrigerant circulating the refrigerant line, in which the flow of the refrigerant may be controlled according to at least one mode for controlling a temperature of an interior of the vehicle or a temperature of a battery module.

The gas injection device may further include a first gas-liquid separator provided on the refrigerant line between the condenser and the heat exchanger and selectively separating a gaseous refrigerant and a liquid refrigerant from the refrigerant introduced thereinto and selectively discharging the separated gaseous refrigerant and liquid refrigerant, a third expansion valve provided on the refrigerant line between the condenser and the first gas-liquid separator, a fourth expansion valve provided on the refrigerant line between the first gas-liquid separator and the heat exchanger, a second refrigerant connection line, one end of which is connected to the first gas-liquid separator and the other end of which is connected to a first valve provided on the refrigerant line between the heat exchanger and the first expansion valve, a second gas-liquid separator provided on the second refrigerant connection line, a third refrigerant connection line, one end of which is connected to the refrigerant line between the heat exchanger and the first valve and the other end of which is connected to the second gas-liquid separator, and a fifth expansion valve provided on the third refrigerant connection line.

The gas injection device may further include a first line selectively supplying the gaseous refrigerant discharged from the first gas-liquid separator or the second gas-liquid separator to the compressor, one end of which is connected to the second refrigerant connection line between the first gas-liquid separator and the second gas-liquid separator and the other end of which is connected to the compressor.

The first gas-liquid separator may be operated when the third expansion valve expands and supplies the refrigerant while the interior of the vehicle is heated and supplies the gaseous refrigerant among the supplied refrigerants to the compressor through the first line to increase the flow rate of the refrigerant circulating the refrigerant line.

The second gas-liquid separator may be operated when the fifth expansion valve expands and supplies the refrigerant while the interior of the vehicle is cooled and supplies the gaseous refrigerant among the supplied refrigerants to the compressor through the first line to increase the flow rate of the refrigerant circulating the refrigerant line.

The gas injection device may further include a second line connecting between the third expansion valve and the fourth expansion valve and selectively bypassing the refrigerant supplied from the condenser to the heat exchanger without passing through the first gas-liquid separator according to an operation of the third expansion valve and the fourth expansion valve.

The gas injection device may further include a second valve provided on the second refrigerant connection line between the first gas-liquid separator and the second gas-liquid separator and a third line having one end connected to the second valve and the other end connected to the refrigerant line between the evaporator and the compressor.

The at least one mode may include a first mode in which the gas injection device is operated and the battery module is cooled while cooling the interior of the vehicle, a second mode in which the gas injection device is operated and the interior of the vehicle is heated, a third mode in which the gas injection device is not operated and the battery module is cooled while cooling the interior of the vehicle, a fourth mode in which the gas injection device is not operated and the interior of the vehicle is heated, and a fifth mode in which the interior of the vehicle is heated and dehumidified.

In the case of the first mode, the first refrigerant connection line may be opened by an operation of the second expansion valve, the second refrigerant connection line may be opened by the operation of the first valve, the third refrigerant connection line may be opened by an operation of the fifth expansion valve, a portion of the refrigerant line connecting the third refrigerant connection line and the first valve may be closed by an operation of the first valve, the first line may be opened by an operation of the second valve, the second line may be opened by an operation of the third expansion valve and the fourth expansion valve, the third line may be closed by the operation of the second valve, the refrigerant line connecting the third expansion valve, the first gas-liquid separator, and the fourth expansion valve may be closed by the operation of the third expansion valve and the fourth expansion valve, the first expansion valve may expand the refrigerant introduced from the second gas-liquid separator along the refrigerant line and supply the expanded refrigerant to the evaporator, the second expansion valve may expand the refrigerant introduced into the first refrigerant connection line and supply the expanded refrigerant to the chiller, the third expansion valve may allow the refrigerant supplied from the condenser to flow into the second line without expanding the refrigerant, the fourth expansion valve may allow the refrigerant supplied through the second line to flow into the heat exchanger without expanding the refrigerant, the fifth expansion valve may expand the refrigerant introduced from the heat exchanger through the third refrigerant connection line and supply the expanded refrigerant to the second gas-liquid separator, and the second gas-liquid separator may supply the gaseous refrigerant among the refrigerants supplied through the third refrigerant connection line to the compressor through the opened second refrigerant connection line and the first line and may discharge the liquid refrigerant to the refrigerant line through the first valve.

In the case of the second mode, the first refrigerant connection line may be closed by an operation of the second expansion valve, the second refrigerant connection line may have a portion connecting the first gas-liquid separator and the first line and a portion connecting the second gas-liquid separator and the third line opened, the third refrigerant connection line may be opened by an operation of the fifth expansion valve, the refrigerant line connecting the evaporator from a rear end of the heat exchanger with respect to the third refrigerant connection line may be closed, the first line may be opened, the second line may be closed by the operation of the third expansion valve and the fourth expansion valve, the third line may be opened by an operation of the second valve, the refrigerant line connecting the third expansion valve, the first gas-liquid separator, and the fourth expansion valve may be opened by the operation of the third expansion valve and the fourth expansion valve, an operation of the first expansion valve and the second expansion valve may stop, the third expansion valve may expand the refrigerant supplied from the condenser and supply the expanded refrigerant to the first gas-liquid separator, the fourth expansion valve may expand the refrigerant supplied from the first gas-liquid separator and supply the expanded refrigerant to the heat exchanger, the fifth expansion valve may supply the refrigerant introduced from the heat exchanger through the third refrigerant connection line to the second gas-liquid separator without expanding the refrigerant, the first gas-liquid separator may supply the gaseous refrigerant among the supplied refrigerants to the compressor through the opened first line, and the second gas-liquid separator may supply the gaseous refrigerant among the refrigerants supplied through the third refrigerant connection line to the compressor through the opened third line.

In the case of the third mode, the first refrigerant connection line may be opened by an operation of the second expansion valve, the second refrigerant connection line may be closed by the operation of the first valve, the third refrigerant connection line may be closed by an operation of the fifth expansion valve, the first line may be closed, the second line may be opened by an operation of the third expansion valve and the fourth expansion valve, the third line may be closed by the operation of the second valve, the refrigerant line connecting the third expansion valve, the first gas-liquid separator, and the fourth expansion valve may be closed by the operation of the third expansion valve and the fourth expansion valve, the first expansion valve may expand the refrigerant introduced from the heat exchanger along the refrigerant line and supply the expanded refrigerant to the evaporator, the second expansion valve may expand the refrigerant introduced into the first refrigerant connection line and supply the expanded refrigerant to the chiller, the third expansion valve may allow the refrigerant supplied from the condenser to flow into the second line without expanding the refrigerant, the fourth expansion valve may allow the refrigerant supplied through the second line to flow into the heat exchanger without expanding the refrigerant, and the operation of the fifth expansion valve may stop.

In the case of the fourth mode, the first refrigerant connection line may be closed by an operation of the second expansion valve, a portion of the second refrigerant connection line connecting the second gas-liquid separator and the third line may be opened by an operation of the second valve, the third refrigerant connection line may be opened by an operation of the fifth expansion valve, the refrigerant line connecting the evaporator from a rear end of the heat exchanger with respect to the third refrigerant connection line may be closed, the first line may be closed, the second line may be opened by the operation of the third expansion valve and the fourth expansion valve, the third line may be opened by an operation of the second valve, the refrigerant line connecting the third expansion valve, the first gas-liquid separator, and the fourth expansion valve may be closed by the operation of the third expansion valve and the fourth expansion valve, an operation of the first expansion valve and the second expansion valve may stop, the third expansion valve may allow the refrigerant supplied from the condenser to flow into the second line without expanding the refrigerant, the fourth expansion valve may expand the refrigerant supplied through the second line and allow the expanded refrigerant to flow into the heat exchanger, the fifth expansion valve may supply the refrigerant introduced into the third refrigerant connection line to the second gas-liquid separator without expanding the refrigerant, and the second gas-liquid separator may supply the gaseous refrigerant among the refrigerants supplied through the third refrigerant connection line to the compressor through the opened third line.

In the case of the fifth mode, the first refrigerant connection line may be closed by an operation of the second expansion valve, a portion of the second refrigerant connection line connecting the second gas-liquid separator and the third line may be opened by an operation of the second valve, the third refrigerant connection line may be opened by an operation of the fifth expansion valve, the refrigerant line connecting the evaporator from a rear end of the heat exchanger with respect to the third refrigerant connection line may be opened by an operation of the first valve and the first expansion valve, the first line may be closed, the second line may be opened by the operation of the third expansion valve and the fourth expansion valve, the third line may be opened by an operation of the second valve, the refrigerant line connecting the third expansion valve, the first gas-liquid separator, and the fourth expansion valve may be closed by the operation of the third expansion valve and the fourth expansion valve, the first expansion valve may selectively expand the refrigerant supplied from the heat exchanger and supply the expanded refrigerant to the evaporator, an operation of the second expansion valve may stop, the third expansion valve may allow the refrigerant supplied from the condenser to flow into the second line without expanding the refrigerant, the fourth expansion valve may expand the refrigerant supplied through the second line and allow the expanded refrigerant to flow into the heat exchanger, the fifth expansion valve may supply the refrigerant introduced into the third refrigerant connection line to the second gas-liquid separator without expanding the refrigerant, and the second gas-liquid separator may supply the gaseous refrigerant among the refrigerants supplied through the third refrigerant connection line to the compressor through the opened third line.

The heat exchanger may condense the supplied refrigerant in the first mode and the third mode.

The heat exchanger may evaporate the supplied refrigerant in the second mode, the fourth mode, and the fifth mode.

The first expansion valve, the second expansion valve, and the fifth expansion valve each may be a 2-way expansion valve that is selectively operated in the at least one mode and selectively expands the refrigerant while controlling the flow of the supplied refrigerant.

The third expansion valve and the fourth expansion valve each may be a 3-way electronic expansion valve that is selectively operated in the at least one mode and selectively expands the refrigerant while controlling the flow of the refrigerant.

The chiller may be connected to the battery module through a coolant line through which coolant is circulated.

The coolant line may be opened to connect the chiller and the battery module when cooling the battery module.

As described above, according to a heat pump system for a vehicle according to an embodiment of the present invention, it is possible to improve cooling and heating performance by applying a gas injection device selectively operating in at least one mode selected for air conditioning of an interior of a vehicle to increase a flow rate of a refrigerant.

In addition, according to embodiments of the present invention, it is possible to simplify the system by maximizing system performance using a gas injection device while minimizing components.

In addition, according to an exemplary embodiment of the present invention, it is possible to reduce the manufacturing cost, reduce the weight, and improve the space utilization by simplifying the entire system.

DETAILED DESCRIPTION OF ILLUSTRATIVE EMBODIMENTS

Figure 1:
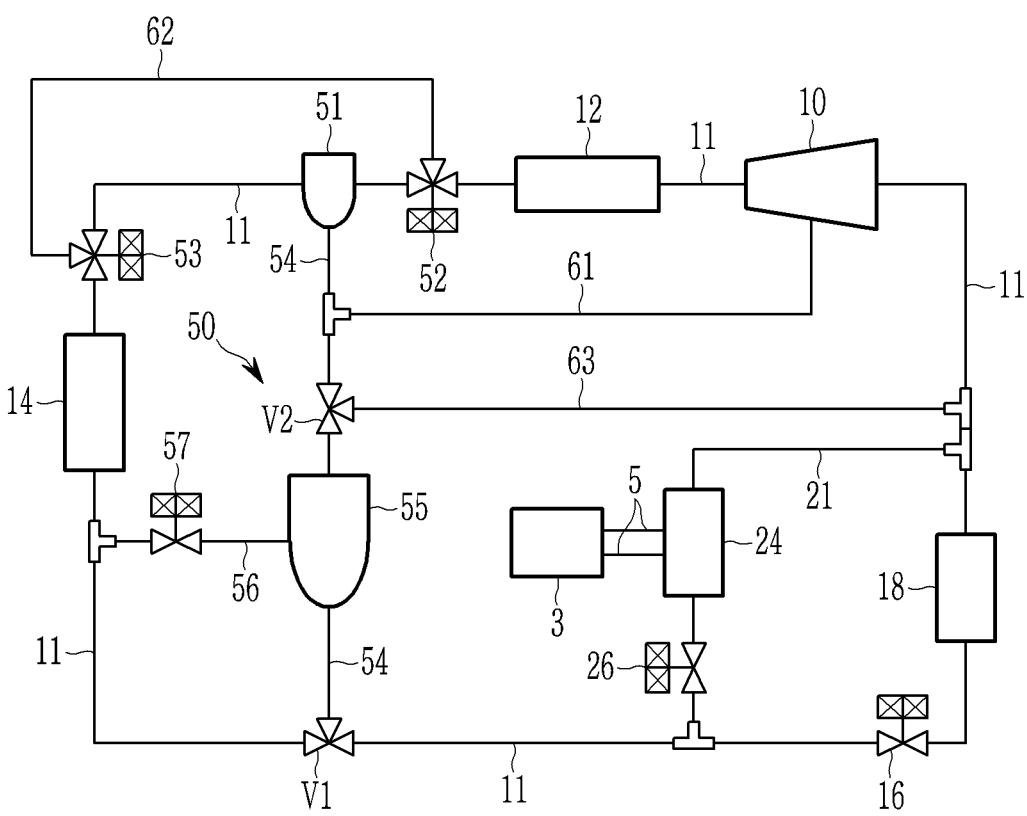
FIG. 1 is a block diagram of a heat pump system for a vehicle according to an embodiment.

Exemplary embodiments will hereinafter be described in detail with reference to the accompanying drawings.

Since exemplary embodiments stated in the present specification and configurations shown in the accompanying drawings are only exemplary embodiments of the present invention, they do not represent the entire spirit of the embodiments of the present invention. Therefore, it is to be understood that various equivalents and modifications may replace exemplary embodiments stated in the present specification and configurations shown in the accompanying drawings at a point in time at which the application is filed.

A description for contents that are not associated with the embodiments of the present invention will be omitted in order to clearly describe the embodiments of the present invention, and like reference numerals designate like elements throughout the specification.

Since sizes and thicknesses of the respective components are arbitrarily shown in the accompanying drawings for convenience of explanation, the embodiments of the present invention are not limited to the contents shown in the accompanying drawings. In addition, thicknesses were exaggerated in order to obviously represent several portions and regions.

In addition, throughout the specification, unless explicitly described to the contrary, the word "comprise" and variations such as "comprises" or "comprising" will be understood to imply the inclusion of stated elements but not the exclusion of any other elements.

In addition, the terms "~unit", "~means", "~part", "~member" described in the specification mean units of a comprehensive configuration for performing at least one function and operation.

FIG. 1 is a block diagram of a heat pump system for a vehicle according to an exemplary embodiment.

A heat pump system for a vehicle according to an embodiment of the present invention may improve cooling and heating performance by applying a gas injection device 50 selectively operating in at least one mode selected for air conditioning of an interior of a vehicle.

Here, the heat pump system may be interconnected with a cooling device that circulates coolant in an electric vehicle and an air conditioning device that is an air conditioning device for cooling and heating the interior.

That is, referring to FIG. 1, the heat pump system may include the air conditioning device that includes the cooling device, a compressor 10, a condenser 12, a heat exchanger 14, a first expansion valve 16, an evaporator 18, a first refrigerant connection line 21, a chiller 24, a second expansion valve 26, and the gas injection device 50.

First, the cooling device may include electrical components (not illustrated) through which coolant circulates and a battery module 3.

This cooling device may further include a radiator (not illustrated). The radiator is disposed in front of the vehicle.

A cooling fan (not illustrated) is provided behind this radiator. Accordingly, the radiator may cool the coolant through an operation of a cooling fan and heat exchange with outside air.

Here, the electrical component may be connected to the heat exchanger 14 or a line through which coolant is circulated to the chiller 24, and the battery module 3 may be connected to the chiller 24 and a coolant line 5 through which coolant is circulated.

Here, when cooling the battery module 3 or recovering waste heat from the battery module 3 when heating the interior of the vehicle, the coolant line 5 may be opened to connect the chiller 24 and the battery module 3.

Here, coolant may be selectively circulated in the coolant line 5 by operating a water pump (not illustrated).

Meanwhile, the electrical component may include an electric power control unit (EPCU), a motor, an inverter, an on board charger (OBC), an autonomous driving controller, or the like.

The electric power control unit, the inverter, the motor, or the autonomous driving controller may generate heat while driving, and the on board charger may generate heat when charging the battery module 3.

That is, when waste heat generated from the electric component is recovered during the heating of the interior of the vehicle, heat generated from the electric power control unit, the motor, the inverter, the on board charger, or the autonomous driving controller may be recovered.

In the present embodiment, the compressor 10 may compress the supplied refrigerant.

The condenser 12 is connected to the compressor 10 through a refrigerant line 11. Here, the condenser 12 and the evaporator 18 may be provided inside an HVAC module (not illustrated).

In addition, the inside of the HVAC module may further include an opening/closing door that controls air passing through the evaporator 18 to be selectively introduced into the condenser 12 when cooling or heating the interior of the vehicle.

That is, when heating the interior of the vehicle, the opening/closing door is opened to allow outside air passing through the evaporator 18 to be introduced into the condenser 12.

On the other hand, when cooling the interior of the vehicle, the opening/closing door closes the condenser 12 side so that the outside air cooled while passing through the evaporator 18 is directly introduced into the interior of the vehicle.

In the present embodiment, the heat exchanger 14 may be connected to the condenser 12 through the refrigerant line 11. This heat exchanger 14 may heat exchange the refrigerant supplied from the condenser 12 with air or coolant to condense or evaporate the refrigerant.

That is, the heat exchanger 14 may be configured as an air-cooled heat exchanger that is disposed behind the radiator at a front of the vehicle and exchanges heat between air and a refrigerant. On the other hand, the heat exchanger 14 may be configured as a water-cooled heat exchanger that is connected to a separate line through which coolant is circulated inside the vehicle to exchange heat between the coolant and a refrigerant.

The first expansion valve 16 may be provided on the refrigerant line 11 between the heat exchanger 14 and the evaporator 18.

The evaporator 18 is connected to the heat exchanger 14 through the refrigerant line 11. When the refrigerant expanded by the first expansion valve 16 is introduced, the evaporator 18 may evaporate the refrigerant by exchanging heat with air introduced into the HVAC module.

In the present embodiment, one end of the first refrigerant connection line 21 may be connected to the refrigerant line 11 between the compressor 10 and the evaporator 18. The other end of the first refrigerant connection line 21 may be connected to the refrigerant line 11 between the heat exchanger 14 and the first expansion valve 16.

The chiller 24 is provided on the first refrigerant connection line 21. The chiller 24 may selectively circulate coolant inside through the coolant line 5.

That is, the chiller 24 may be the water-cooled heat exchanger into which the coolant is introduced.

Accordingly, the chiller 24 may control the temperature of the coolant by exchanging heat between the refrigerant introduced into the first refrigerant connection line 21 and the coolant selectively introduced through the coolant line 5.

In the present embodiment, the second expansion valve 26 may be provided on the first refrigerant connection line 21 at the front end of the chiller 24.

This second expansion valve 26 may expand the refrigerant introduced through the first refrigerant connection line 21 when cooling the battery module 3 using the coolant that has heat-exchanged with the refrigerant during cooling of the interior of the vehicle and may introduce the expanded refrigerant into the chiller 24.

That is, when cooling the battery module 3 during cooling of the interior of the vehicle, the second expansion valve 26 may expand the refrigerant introduced into the first refrigerant connection line 21 and introduce the expanded refrigerant into the chiller 24 while the temperature of the expanded refrigerant is lowered, thereby further lowering the water temperature of the coolant passing through the inside of the chiller 24.

Accordingly, the coolant whose water temperature is lowered while passing through the chiller 24 is introduced into the battery module 3, and thus, the battery module 3 may be cooled more efficiently.

The gas injection device 50 may be connected to the refrigerant line 11. The gas injection device 50 may selectively expand and flow the refrigerant supplied from the condenser 12 or the heat exchanger 14 and may selectively supply some of the supplied refrigerant to the compressor 10 to increase an overall flow rate of the refrigerant circulating the refrigerant line 11.

Here, the gas injection device 50 may include a first gas-liquid separator 51, a third expansion valve 52, a fourth expansion valve 53, a second refrigerant connection line 54, a second gas-liquid separator 55, a third refrigerant connection line 56, and a fifth expansion valve 57.

First, the first gas-liquid separator 51 may be provided on the refrigerant line 11 between the condenser 12 and the heat exchanger 14. The first gas-liquid separator 51 may separate a gaseous refrigerant and a liquid refrigerant among the refrigerants introduced thereinto and selectively discharge the gaseous refrigerant and the liquid refrigerant.

In the present embodiment, the third expansion valve 52 may be provided on the refrigerant line 11 between the condenser 12 and the first gas-liquid separator 51.

The fourth expansion valve 53 may be provided on the refrigerant line 11 between the first gas-liquid separator 51 and the heat exchanger 14.

One end of the second refrigerant connection line 54 may be connected to the first gas-liquid separator 51. The other end of the second refrigerant connection line 54 may be connected to a first valve V1 provided on the refrigerant line 11 between the heat exchanger 14 and the first expansion valve 16.

In the present embodiment, the second gas-liquid separator 55 may be provided on the second refrigerant connection line 54. The second gas-liquid separator 55 may separate a gaseous refrigerant and a liquid refrigerant among the refrigerants introduced thereinto and may selectively discharge the gaseous refrigerant and the liquid refrigerant.

One end of the third refrigerant connection line 56 may be connected to the refrigerant line 11 between the heat exchanger 14 and the first valve V1. The other end of the third refrigerant connection line 56 may be connected to the second gas-liquid separator 55.

The fifth expansion valve 57 may be provided on the third refrigerant connection line 56.

The gas injection device 50 configured as described above may further include a first line 61, a second line 62, a second valve V2, and a third line 63.

First, one end of the first line 61 may be connected to the second refrigerant connection line 54 between the first gas-liquid separator 51 and the second gas-liquid separator 55. The other end of the first line 61 may be connected to the compressor 10.

The first line 61 configured as described above may selectively supply the gaseous refrigerant discharged from the first gas-liquid separator 51 or the second gas-liquid separator 55 to the compressor 10.

That is, the first gas-liquid separator 51 may be operated when the third expansion valve 52 expands and supplies the refrigerant while the interior of the vehicle is being heated.

Here, the first gas-liquid separator 51 may supply the gaseous refrigerant among the supplied refrigerants to the compressor 10 through the first line 61 to increase the flow rate of the refrigerant circulating in the refrigerant line 11.

Meanwhile, the second gas-liquid separator 55 may be operated when the fifth expansion valve 57 expands and supplies the refrigerant while the interior of the vehicle is being cooled.

Here, the second gas-liquid separator 55 may supply the gaseous refrigerant among the supplied refrigerants to the compressor 10 through the first line 61 to increase the flow rate of the refrigerant circulating in the refrigerant line 11.

In the present embodiment, the second line 62 may connect the third expansion valve 52 and the fourth expansion valve 53.

The second line 62 may selectively bypass the refrigerant supplied from the condenser 12 to the heat exchanger 14 according to the operation of the third expansion valve 52 and the fourth expansion valve 53 without passing through the first gas-liquid separator 51.

The second valve V2 may be provided on the second refrigerant connection line 54 between the first gas-liquid separator 51 and the second gas-liquid separator 55.

Here, the first valve V1 and the second valve V2 each may be a 3-way valve that can distribute the flow rate while controlling the flow of the refrigerant.

One end of the third line 63 may be connected to the second valve V2. The other end of the third line 63 may be connected to the refrigerant line 11 between the evaporator 18 and the compressor 10.

The heat pump system configured as described above may control the flow of the refrigerant according to at least one mode for controlling the temperature of the interior of the vehicle or the temperature of the battery module.

Here, the first expansion valve 16, the second expansion valve 26, and the fifth expansion valve 57 may be selectively operated in the at least one mode.

That is, the first expansion valve 16, the second expansion valve 26, and the fifth expansion valve 57 are 2-way expansion valves that selectively expand the refrigerant while controlling the flow of the supplied refrigerant.

The third expansion valve 52 and the fourth expansion valve 53 may be selectively operated in the at least one mode. That is, the third expansion valve 52 and the fourth expansion valve 53 may be 3-way electronic expansion valves that selectively expand the refrigerant while controlling the flow of the refrigerant.

Here, the at least one mode may include first to fifth modes.

First, in the first mode, the gas injection device 50 may be operated and the battery module 3 may be cooled while the interior of the vehicle is cooled.

In the second mode, the gas injection device 50 may be operated and the interior of the vehicle may be heated.

In the third mode, the gas injection device 50 may not be operated and the battery module 3 may be cooled while the interior of the vehicle is cooled.

In the present embodiment, in the fourth mode, the gas injection device 50 may not be operated and the interior of the vehicle may be heated.

The fifth mode may heat and dehumidify the interior of the vehicle.

Here, the heat exchanger 14 may condense the supplied refrigerant in the first mode and the third mode.

On the other hand, the heat exchanger 14 may evaporate the supplied refrigerant in the second mode, the fourth mode, and the fifth mode.

The operation and action of each mode of the heat pump system according to embodiments of the present invention configured as described above will be described in detail with reference to FIGS. 2 to 6.

First, in the heat pump system according to an embodiment of the present invention, the operation according to the first mode in which the gas injection device 50 is operated and the battery module 3 is cooled while the interior of the vehicle is cooled will be described with reference to FIG. 2.

Figure 2:
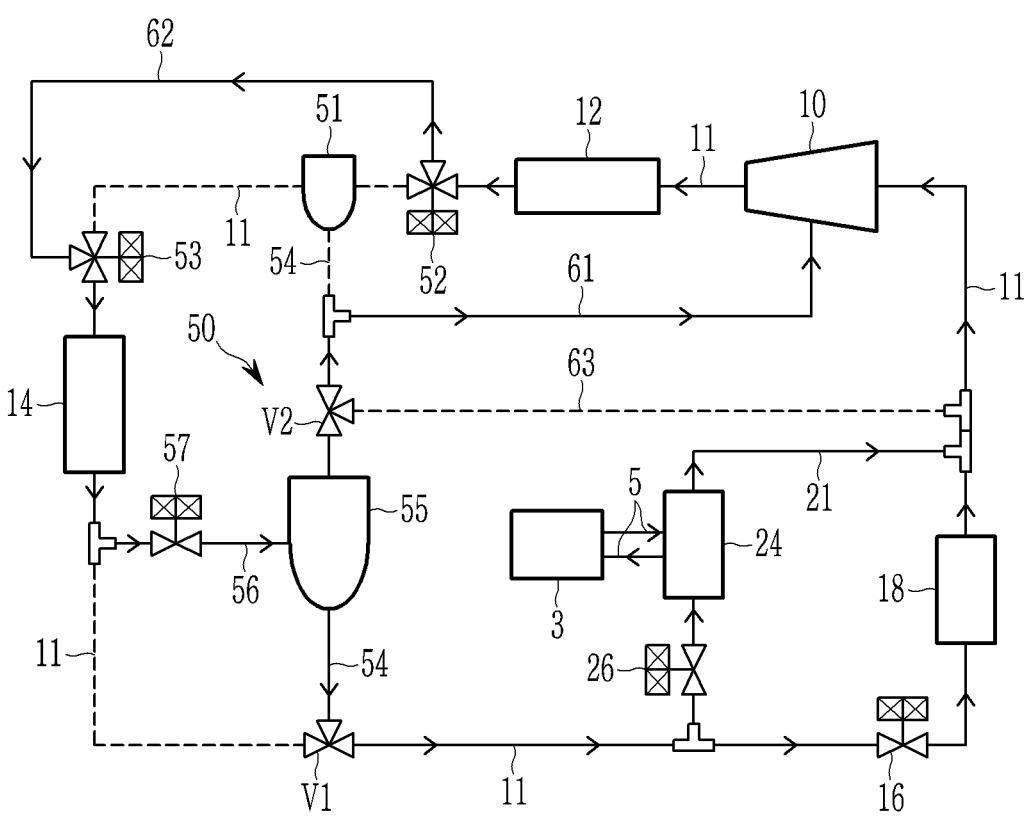
FIG. 2 is an operation state diagram according to a first mode in the heat pump system for a vehicle according to an embodiment of the present invention.

FIG. 2 is an operation state diagram according to a first mode in the heat pump system for a vehicle according to an embodiment of the present invention.

Referring to FIG. 2, in the case of the first mode, the compressor 10 is operated to allow the refrigerant to flow along the refrigerant line 11 in order to cool the interior of the vehicle.

Here, the first refrigerant connection line 21 is opened by the operation of the second expansion valve 26. The second refrigerant connection line 54 may be opened by the operation of the first valve V1.

The third refrigerant connection line 56 is opened by the operation of the fifth expansion valve 57. Here, a portion of the refrigerant line 11 connecting the third refrigerant connection line 56 and the first valve V1 may be closed by the operation of the first valve V1.

That is, the refrigerant line 11 connecting the third refrigerant connection line 56 and the first valve V1 from a rear end of the heat exchanger 14 with respect to the third refrigerant connection line 56 is closed by the operation of the first valve V1.

Here, the front end of the heat exchanger 14 and the rear end of the heat exchanger 14 may be set based on the flow direction of the refrigerant.

That is, based on the direction in which the refrigerant flows along the refrigerant line 11, the position where the refrigerant is introduced into the heat exchanger 14 may be defined as the front end of the heat exchanger 14, and the position where the refrigerant is discharged from the heat exchanger 14 may be defined as the rear end of the heat exchanger 14.

In the present embodiment, the first line 61 is opened by the operation of the second valve V2. The second line 62 may be opened by the operation of the third expansion valve 52 and the fourth expansion valve 53.

The third line 63 is closed by the operation of the second valve V2.

In this case, the refrigerant line 11 connecting the third expansion valve 52, the first gas-liquid separator 51, and the fourth expansion valve 53 may be closed by the operation of the third expansion valve 52 and the fourth expansion valve 53.

Then, the refrigerant supplied from the compressor 10 to the condenser 12 is introduced into the third expansion valve 52 along the refrigerant line 11.

The third expansion valve 52 may allow the refrigerant supplied from the condenser 12 to flow into the second line 62 without expanding the refrigerant.

The fourth expansion valve 53 allows the refrigerant supplied through the second line 62 to flow into the heat exchanger 14 without expanding the refrigerant.

The heat exchanger 14 condenses the introduced refrigerant by exchanging heat with a working fluid such as air or coolant. The refrigerant discharged from the heat exchanger 14 is introduced into the third refrigerant connection line 56.

In this case, the fifth expansion valve 57 may expand the refrigerant introduced from the heat exchanger 14 through the third refrigerant connection line 56 and may supply the expanded refrigerant to the second gas-liquid separator 55.

Here, the second gas-liquid separator 55 may supply the gaseous refrigerant among the refrigerants supplied through the third refrigerant connection line 56 to the compressor 10 through the opened second refrigerant connection line 54 and first line 61.

That is, the gas injection device 50 may introduce the gaseous refrigerant separated while passing through the second gas-liquid separator 55 back into the compressor 10 through the first line 61, thereby increasing the flow rate of the refrigerant circulated on the refrigerant line 11.

Meanwhile, the second gas-liquid separator 55 may discharge the liquid refrigerant among the refrigerants supplied through the third refrigerant connection line 56 to the connected refrigerant line 11 through the second refrigerant connection line 54 and the first valve V1.

Some of the refrigerants discharged to the refrigerant line 11 may be introduced into the opened first refrigerant connection line 21, and the rest of the refrigerants may be introduced into the first expansion valve 16.

Here, the second expansion valve 26 may expand the refrigerant introduced into the first refrigerant connection line 21 and may supply the expanded refrigerant to the chiller 24.

The refrigerant introduced into the chiller 24 may cool the coolant by exchanging heat with the coolant supplied from the battery module 3 through the coolant line 5.

The coolant cooled in the chiller 24 is supplied to the battery module 3 along the coolant line 5. Accordingly, the battery module 3 may be efficiently cooled by the coolant cooled in the chiller 24.

That is, the coolant circulated through the coolant line 5 may efficiently cool the battery module 3 while repeatedly performing the above-described operation.

Meanwhile, the first expansion valve 16 may expand the refrigerant introduced through the refrigerant line 11 and supply the expanded refrigerant to the evaporator 15.

Here, the outside air introduced into the HVAC module is cooled by the refrigerant, which is introduced into the evaporator 18 and is in a low-temperature state, while passing through the evaporator 18.

In this case, the opening/closing door of the HVAC module closes a portion passing through the condenser 12 so that the cooled outside air does not pass through the condenser 12. Therefore, the cooled outside air may be directly introduced into the interior of the vehicle, thereby cooling the interior of the vehicle.

Meanwhile, the refrigerant that has passed through the evaporator 18 and the chiller 24, respectively, may be introduced into the compressor 10 together with the refrigerant moving along the first line 61.

That is, the refrigerant that has passed through the evaporator 18 and the chiller 24, respectively, and the refrigerant supplied from the second gas-liquid separator 55 through the first line 61 will be introduced into the compressor 10. The introduced refrigerant may be compressed by operating the compressor 10.

The refrigerant compressed in the compressor 10 passes through the condenser 12 and is then supplied to the third expansion valve 52 along the refrigerant line 11.

Then, the heat pump system may repeat the above-described process.

That is, the heat pump system may increase the flow rate of the refrigerant moving along the refrigerant line 11 while repeatedly performing the above-described operation.

In addition, the heat pump system may improve overall cooling performance and efficiency and efficiently cool the interior of the vehicle by increasing the flow rate of the refrigerant moving along the refrigerant line 11.

At the same time, the heat pump system may efficiently cool the battery module 3 using the low-temperature coolant cooled in the chiller 24.

In the present embodiment, the operation according to the second mode in which the gas injection device 50 is operated and the interior of the vehicle is heated will be described with reference to FIG. 3.

Figure 3:
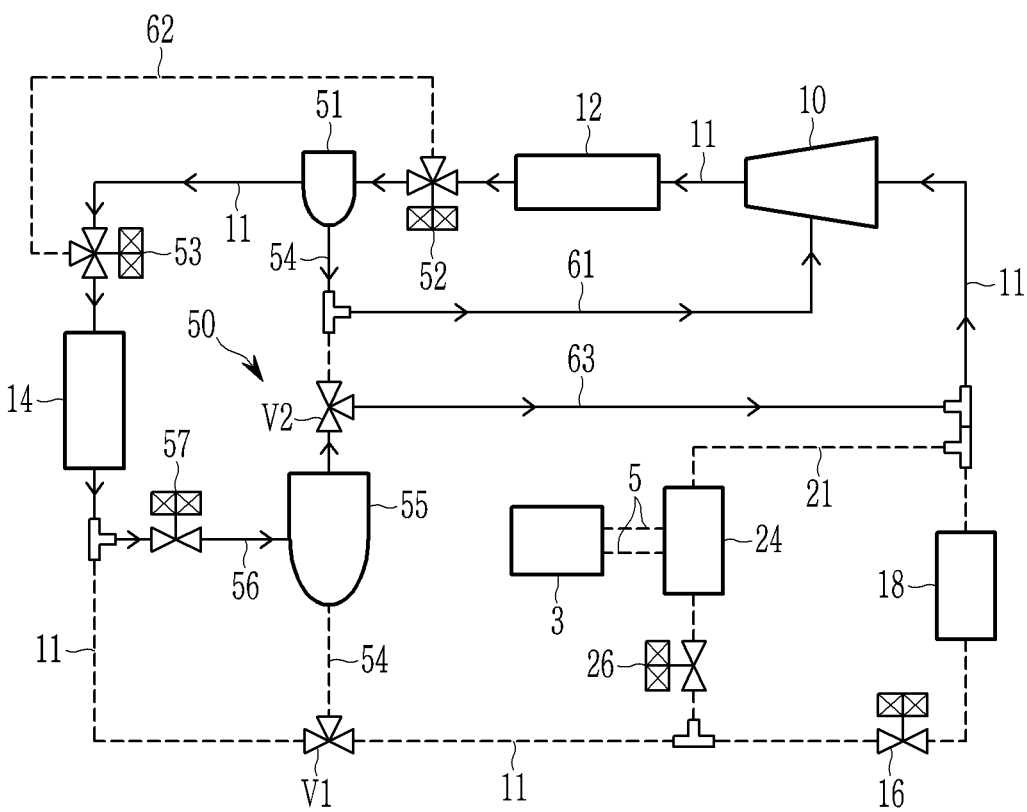
FIG. 3 is an operation state diagram according to a second mode in the heat pump system for a vehicle according to an embodiment of the present invention.

FIG. 3 is an operation state diagram according to the second mode in the heat pump system for a vehicle according to an embodiment of the present invention.

Referring to FIG. 3, in the case of the second mode, the compressor 10 is operated to allow the refrigerant to flow along the refrigerant line 11 in order to heat the interior of the vehicle.

Here, the first refrigerant connection line 21 is closed by the operation of the second expansion valve 26.

The second refrigerant connection line 54 may have a portion connecting the first gas-liquid separator 51 and the first line 61 and a portion connecting the second gas-liquid separator 55 and the third line 63 opened.

The third refrigerant connection line 56 is opened by the operation of the fifth expansion valve 57.

Here, the refrigerant line 11 connecting the evaporator 18 from the rear end of the heat exchanger 14 with respect to the third refrigerant connection line 56 may be closed by the operation of the first valve V1.

In addition, a portion of the second refrigerant connection line 54 connecting the second gas-liquid separator 55 and the first valve V1 may be closed by the operation of the first valve V1.

Here, the front end of the heat exchanger 14 and the rear end of the heat exchanger 14 may be set based on the flow direction of the refrigerant.

That is, based on the direction in which the refrigerant flows along the refrigerant line 11, the position where the refrigerant is introduced into the heat exchanger 14 may be defined as the front end of the heat exchanger 14, and the position where the refrigerant is discharged from the heat exchanger 14 may be defined as the rear end of the heat exchanger 14.

Meanwhile, the first line 61 may be opened. The second line 62 may be closed by the operation of the third expansion valve 52 and the fourth expansion valve 53.

In this case, the refrigerant line 11 connecting the third expansion valve 52, the first gas-liquid separator 51, and the fourth expansion valve 53 may be opened by the operation of the third expansion valve 52 and the fourth expansion valve 53.

Here, a portion of the second refrigerant connection line 54 connecting the first gas-liquid separator 51 and the first line 61 may be opened.

The third line 63 may be opened by the operation of the second valve V2.

In this case, a portion of the second refrigerant connection line 54 connecting the second valve V2 and the first line 61 with respect to the first line 61 may be closed.

Then, the refrigerant supplied from the compressor 10 to the condenser 12 is introduced into the third expansion valve 52 along the refrigerant line 11.

The third expansion valve 52 may expand the refrigerant supplied from the condenser 12 and supply the expanded refrigerant to the first gas-liquid separator 51.

The first gas-liquid separator 51 may supply the gaseous refrigerant among the supplied refrigerants to the compressor 10 through the opened first line 61.

That is, the gas injection device 50 may introduce the gaseous refrigerant separated while passing through the first gas-liquid separator 51 back into the compressor 10 through the first line 61, thereby increasing the flow rate of the refrigerant circulated on the refrigerant line 11.

Meanwhile, the first gas-liquid separator 51 supplies the liquid refrigerant among the refrigerants supplied from the third expansion valve 52 to the fourth expansion valve 53 through the refrigerant line 11.

The fourth expansion valve 53 may expand the refrigerant supplied from the first gas-liquid separator 51 and supply the expanded refrigerant to the heat exchanger 14.

The heat exchanger 14 evaporates the introduced refrigerant by exchanging heat with a working fluid such as air or coolant. The refrigerant discharged from the heat exchanger 14 is introduced into the third refrigerant connection line 56.

In this case, the fifth expansion valve 57 may supply the refrigerant to the second gas-liquid separator 55 without expanding the refrigerant introduced from the heat exchanger 14 through the third refrigerant connection line 56.

Here, the second gas-liquid separator 55 may supply the gaseous refrigerant among the refrigerants supplied through the third refrigerant connection line 56 to the compressor 10 through the opened second refrigerant connection line 54 and the opened third line 63.

Meanwhile, the operation of the first expansion valve 16 and the second expansion valve 26 may stop.

That is, the refrigerant discharged from the first gas-liquid separator 51 and the refrigerant discharged from the second gas-liquid separator 55 may be introduced into the compressor 10 together. The introduced refrigerant may be compressed by operating the compressor 10.

The refrigerant compressed in the compressor 10 is supplied to the condenser 12 along the refrigerant line 11. Here, the refrigerant supplied to the condenser 12 may increase the temperature of the outside air introduced into the HVAC module.

The opening/closing door is opened to allow the outside air, which is introduced into the HVAC module and passed through the evaporator 18, to pass through the condenser 12.

Therefore, the outside air introduced from the outside is introduced in a room temperature state in which it is not cooled at the time of passing through the evaporator 18 to which the refrigerant is not supplied. The introduced outside air is changed to a high temperature state while passing through the condenser 12 and is then introduced into the interior of the vehicle, such that heating of the interior of the vehicle may be implemented.

In this way, the heat pump system according to an embodiment of the present invention may improve the overall heating performance and efficiency as the gas injection device 50 is operated together.

In addition, embodiments of the present invention may improve the heating efficiency and performance while minimizing the use of a separate electric heater.

Furthermore, the gas injection device 50 may increase the flow rate of the refrigerant circulated on the refrigerant line 11, thereby maximizing the heating performance.

In the present embodiment, the operation according to the third mode in which the gas injection device 50 is not operated and the battery module 3 is cooled while the interior of the vehicle is cooled will be described with reference to FIG. 4.

Figure 4:
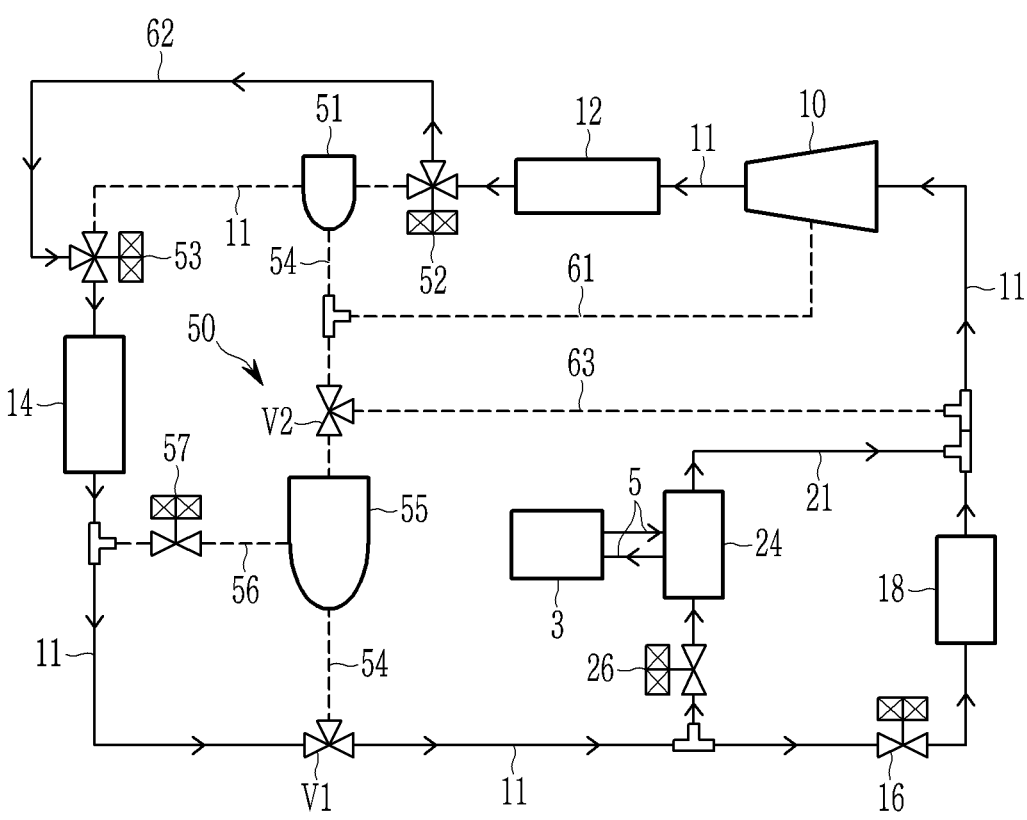
FIG. 4 is an operation state diagram according to a third mode in the heat pump system for a vehicle according to an embodiment of the present invention.

FIG. 4 is an operation state diagram according to a third mode in the heat pump system for a vehicle according to an embodiment of the present invention.

Referring to FIG. 4, in the case of the third mode, the compressor 10 is operated to allow refrigerant to flow along the refrigerant line 11 in order to cool the interior of the vehicle.

Here, the first refrigerant connection line 21 is opened by the operation of the second expansion valve 26. The second refrigerant connection line 54 may be closed by the operation of the first valve V1.

The third refrigerant connection line 56 is closed by the operation of the fifth expansion valve 57. Here, the operation of the fifth expansion valve 57 may stop.

In the present embodiment, the first line 61 is closed. The second line may be opened by the operation of the third expansion valve 52 and the fourth expansion valve 53.

The third line 63 is closed by the operation of the second valve V2.

In this case, the refrigerant line 11 connecting the third expansion valve 52, the first gas-liquid separator 51, and the fourth expansion valve 53 may be closed by the operation of the third expansion valve 52 and the fourth expansion valve 53.

Then, the refrigerant supplied from the compressor 10 to the condenser 12 is introduced into the third expansion valve 52 along the refrigerant line 11.

The third expansion valve 52 may allow the refrigerant supplied from the condenser 12 to flow into the second line 62 without expanding the refrigerant.

The fourth expansion valve 53 allows the refrigerant supplied through the second line 62 to flow into the heat exchanger 14 without expanding the refrigerant.

The heat exchanger 14 condenses the introduced refrigerant by exchanging heat with a working fluid such as air or coolant. The refrigerant discharged from the heat exchanger 14 flows along the refrigerant line 11.

Some of the refrigerants discharged from the heat exchanger 14 may be introduced into the opened first refrigerant connection line 21, and the rest of the refrigerants may be introduced into the first expansion valve 16.

Here, the second expansion valve 26 may expand the refrigerant introduced into the first refrigerant connection line 21 and may supply the expanded refrigerant to the chiller 24.

The refrigerant introduced into the chiller 24 may cool the coolant by exchanging heat with the coolant supplied from the battery module 3 through the coolant line 5.

The coolant cooled in the chiller 24 is supplied to the battery module 3 along the coolant line 5. Accordingly, the battery module 3 may be efficiently cooled by the coolant cooled in the chiller 24.

That is, the coolant circulated through the coolant line 5 may efficiently cool the battery module 3 while repeatedly performing the above-described operation.

Meanwhile, the first expansion valve 16 may expand the refrigerant introduced through the refrigerant line 11 from the heat exchanger 14 and may supply the expanded refrigerant to the evaporator 15.

Here, the outside air introduced into the HVAC module is cooled by the refrigerant, which is introduced into the evaporator 18 and is in a low-temperature state, while passing through the evaporator 18.

In this case, the opening/closing door of the HVAC module closes a portion passing through the condenser 12 so that the cooled outside air does not pass through the condenser 12. Therefore, the cooled outside air may be directly introduced into the interior of the vehicle, thereby cooling the interior of the vehicle.

Meanwhile, the refrigerant that has passed through the evaporator 18 and the chiller 24, respectively, may be introduced into the compressor 10.

That is, the refrigerant that has passed through the evaporator 18 and the chiller 24, respectively, may be introduced into the compressor 10. The introduced refrigerant may be compressed by operating the compressor 10.

The refrigerant compressed in the compressor 10 passes through the condenser 12 and is then supplied to the third expansion valve 52 along the refrigerant line 11.

Then, the heat pump system may repeat the above-described process.

That is, the heat pump system may cool the interior of the vehicle without operating the gas injection device 50 while repeatedly performing the above-described operation.

At the same time, the heat pump system may efficiently cool the battery module 3 using the low-temperature coolant cooled in the chiller 24.

In the present embodiment, the operation according to the fourth mode in which the gas injection device 50 is not operated and the interior of the vehicle is heated will be described with reference to FIG. 5.

Figure 5:
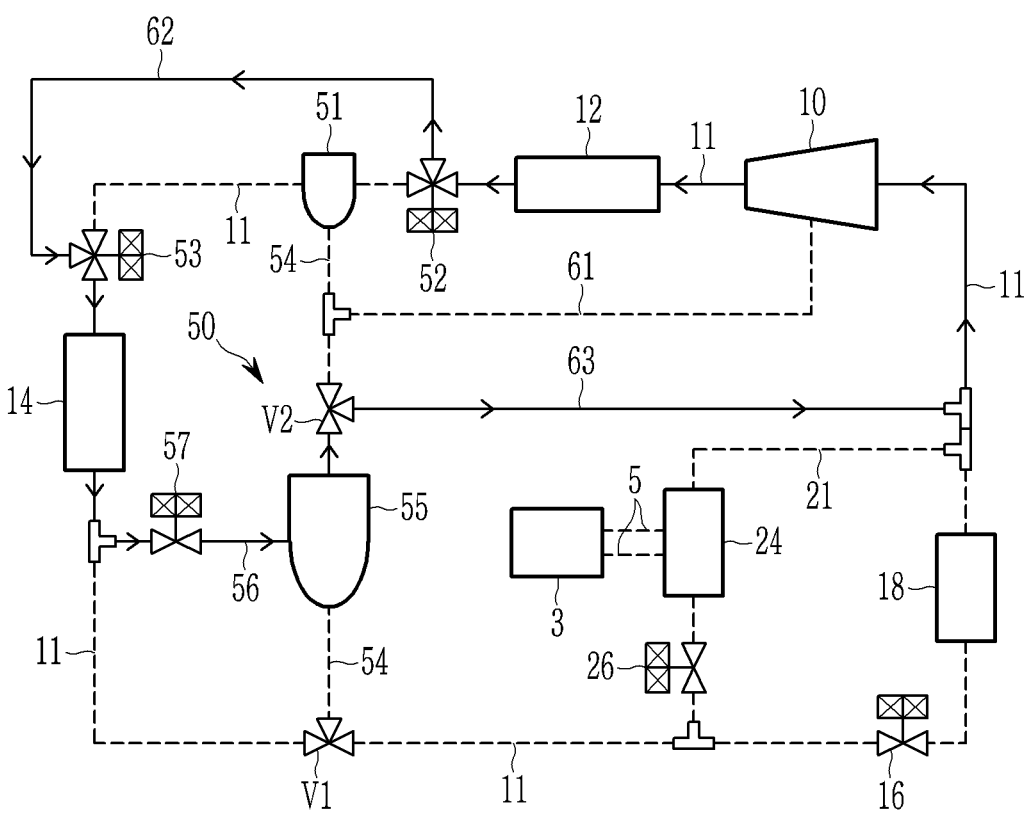
FIG. 5 is an operation state diagram according to a fourth mode in the heat pump system for a vehicle according to an embodiment of the present invention.

FIG. 5 is an operation state diagram according to a fourth mode in the heat pump system for a vehicle according to an embodiment of the present invention.

Referring to FIG. 5, in the case of the fourth mode, the compressor 10 is operated to allow the refrigerant to flow along the refrigerant line 11 in order to heat the interior of the vehicle.

Here, the first refrigerant connection line 21 is closed by the operation of the second expansion valve 26.

A portion of the second refrigerant connection line 54 connecting the second gas-liquid separator 55 and the third line 63 may be opened by the operation of the second valve V2.

The third refrigerant connection line 56 is opened by the operation of the fifth expansion valve 57.

Here, the refrigerant line 11 connecting the evaporator 18 from the rear end of the heat exchanger 14 with respect to the third refrigerant connection line 56 may be closed by the operation of the first valve V1.

In addition, a portion of the second refrigerant connection line 54 connecting the second gas-liquid separator 55 and the first valve V1 may be closed by the operation of the first valve V1.

Here, the front end of the heat exchanger 14 and the rear end of the heat exchanger 14 may be set based on the flow direction of the refrigerant.

That is, based on the direction in which the refrigerant flows along the refrigerant line 11, the position where the refrigerant is introduced into the heat exchanger 14 may be defined as the front end of the heat exchanger 14, and the position where the refrigerant is discharged from the heat exchanger 14 may be defined as the rear end of the heat exchanger 14.

In the present embodiment, the first line 61 is closed. The second line 62 may be opened by the operation of the third expansion valve 52 and the fourth expansion valve 53.

The third line 63 may be opened by the operation of the second valve V2.

In this case, the refrigerant line 11 connecting the third expansion valve 52, the first gas-liquid separator 51, and the fourth expansion valve 53 may be closed by the operation of the third expansion valve 52 and the fourth expansion valve 53.

Then, the refrigerant supplied from the compressor 10 to the condenser 12 is introduced into the third expansion valve 52 along the refrigerant line 11.

The third expansion valve 52 may allow the refrigerant supplied from the condenser 12 to flow into the second line 62 without expanding the refrigerant.

The fourth expansion valve 53 may expand the refrigerant supplied through the second line 62 and may supply the expanded refrigerant to the heat exchanger 14.

The heat exchanger 14 evaporates the introduced refrigerant by exchanging heat with a working fluid such as air or coolant. The refrigerant discharged from the heat exchanger 14 is introduced into the third refrigerant connection line 56.

In this case, the fifth expansion valve 57 may supply the refrigerant to the second gas-liquid separator 55 without expanding the refrigerant introduced from the heat exchanger 14 through the third refrigerant connection line 56.

Here, the second gas-liquid separator 55 may supply the gaseous refrigerant among the refrigerants supplied through the third refrigerant connection line 56 to the compressor 10 through the opened second refrigerant connection line 54 and the opened third line 63.

Meanwhile, the operation of the first expansion valve 16 and the second expansion valve 26 may stop.

That is, the refrigerant discharged from the second gas-liquid separator 55 may be introduced into the compressor 10. The introduced refrigerant may be compressed by operating the compressor 10.

The refrigerant compressed in the compressor 10 is supplied to the condenser 12 along the refrigerant line 11. Here, the refrigerant supplied to the condenser 12 may increase the temperature of the outside air introduced into the HVAC module.

The opening/closing door is opened to allow the outside air, which is introduced into the HVAC module and passed through the evaporator 18, to pass through the condenser 12.

Therefore, the outside air introduced from the outside is introduced in a room temperature state in which it is not cooled at the time of passing through the evaporator 18 to which the refrigerant is not supplied. The introduced outside air is changed to a high temperature state while passing through the condenser 12 and is then introduced into the interior of the vehicle, such that heating of the interior of the vehicle may be implemented.

The refrigerant condensed in the condenser 12 may be supplied to the heat exchanger 14 along the second line 62 and the refrigerant line 11 which are opened by the operation of the third and fourth expansion valves 52 and 53.

That is, the heat pump system may heat the interior of the vehicle without operating the gas injection device 50 while repeatedly performing the operation.

In addition, embodiments of the present invention may recover waste heat sources from the air or electrical component in the condenser 12 and the heat exchanger 14, thereby improving the heating efficiency and performance while minimizing the use of separate electric heaters.

The operation according to the fifth mode in which the interior of the vehicle is heated and dehumidified will be described with reference to FIG. 6.

Figure 6:
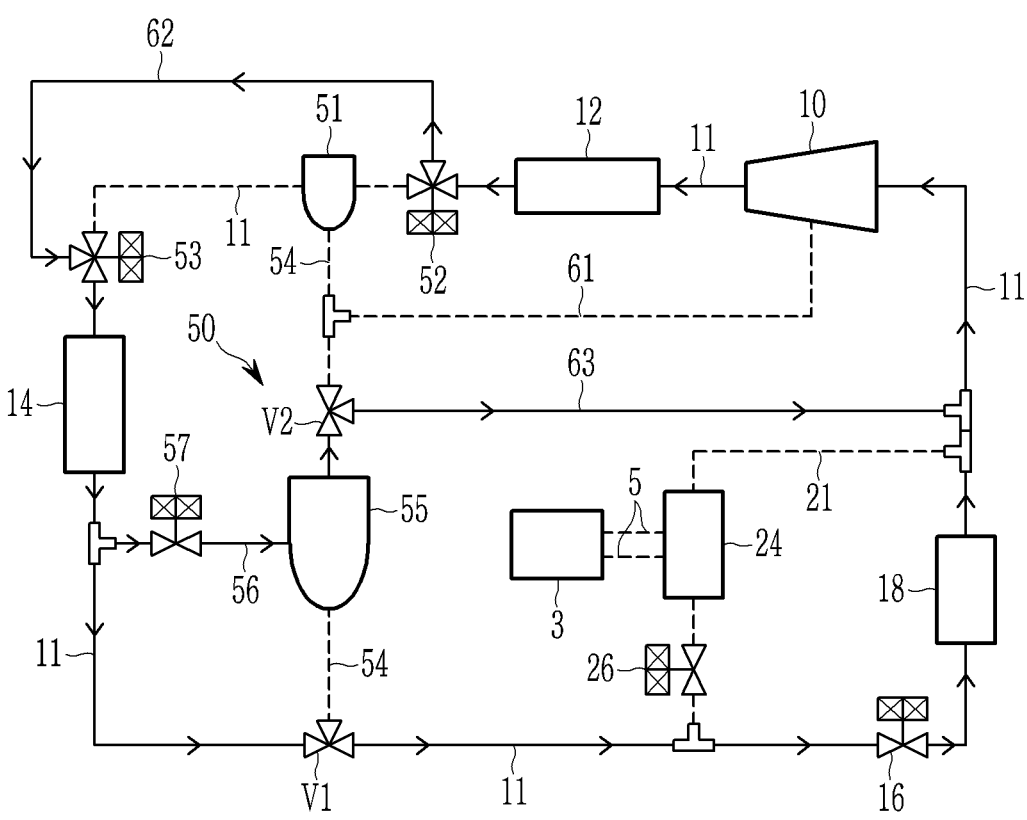
FIG. 6 is an operation state diagram according to a fifth mode in the heat pump system for a vehicle according to an embodiment of the present invention.

FIG. 6 is an operation state diagram according to a fifth mode in the heat pump system for a vehicle according to an embodiment of the present invention.

Referring to FIG. 6, in the case of the fifth mode, the compressor 10 is operated to allow the refrigerant to flow along the refrigerant line 11 in order to heat and dehumidify the interior of the vehicle.

Here, the first refrigerant connection line 21 is closed by the operation of the second expansion valve 26.

A portion of the second refrigerant connection line 54 connecting the second gas-liquid separator 55 and the third line 63 may be opened by the operation of the second valve V2.

The third refrigerant connection line 56 is opened by the operation of the fifth expansion valve 57.

Here, the refrigerant line 11 connecting the evaporator 18 from the rear end of the heat exchanger 14 with respect to the third refrigerant connection line 56 may be opened by the operation of the first valve V1 and the first expansion valve 16.

In addition, a portion of the second refrigerant connection line 54 connecting the second gas-liquid separator 55 and the first valve V1 may be closed by the operation of the first valve V1.

Here, the front end of the heat exchanger 14 and the rear end of the heat exchanger 14 may be set based on the flow direction of the refrigerant.

That is, based on the direction in which the refrigerant flows along the refrigerant line 11, the position where the refrigerant is introduced into the heat exchanger 14 may be defined as the front end of the heat exchanger 14, and the position where the refrigerant is discharged from the heat exchanger 14 may be defined as the rear end of the heat exchanger 14.

In the present embodiment, the first line 61 is closed. The second line 62 may be opened by the operation of the third expansion valve 52 and the fourth expansion valve 53.

The third line 63 may be opened by the operation of the second valve V2.

In this case, the refrigerant line 11 connecting the third expansion valve 52, the first gas-liquid separator 51, and the fourth expansion valve 53 may be closed by the operation of the third expansion valve 52 and the fourth expansion valve 53.

Then, the refrigerant supplied from the compressor 10 to the condenser 12 is introduced into the third expansion valve 52 along the refrigerant line 11.

The third expansion valve 52 may allow the refrigerant supplied from the condenser 12 to flow into the second line 62 without expanding the refrigerant.

The fourth expansion valve 53 may expand the refrigerant supplied through the second line 62 and may supply the expanded refrigerant to the heat exchanger 14.

The heat exchanger 14 evaporates the introduced refrigerant by exchanging heat with a working fluid such as air or coolant. Some of the refrigerants discharged from the heat exchanger 14 are introduced into the opened third refrigerant connection line 56.

In this case, the fifth expansion valve 57 may supply the refrigerant to the second gas-liquid separator 55 without expanding the refrigerant introduced from the heat exchanger 14 through the third refrigerant connection line 56.

Here, the second gas-liquid separator 55 may supply the gaseous refrigerant among the refrigerants supplied through the third refrigerant connection line 56 to the compressor 10 through the opened second refrigerant connection line 54 and the opened third line 63.

Meanwhile, the rest of the refrigerants discharged from the heat exchanger 14 are introduced into the first expansion valve 16 along the opened refrigerant line 11.

The first expansion valve 16 may expand the refrigerant supplied from the heat exchanger 14 and may supply the expanded refrigerant to the evaporator 18. The refrigerant discharged from the evaporator 18 may be supplied to the compressor 10.

That is, the refrigerant discharged from the second gas-liquid separator 55 and the refrigerant discharged from the evaporator 18 may be introduced into the compressor 10 together. The introduced refrigerant may be compressed by operating the compressor 10.

The refrigerant compressed in the compressor 10 is supplied to the condenser 12 along the refrigerant line 11. Here, the refrigerant supplied to the condenser 12 may increase the temperature of the outside air introduced into the HVAC module.

The opening/closing door is opened to allow the outside air, which is introduced into the HVAC module and passed through the evaporator 18, to pass through the condenser 12.

Therefore, the outside air introduced into the HVAC module is dehumidified by the refrigerant, which is introduced into the evaporator 18 and is in a low-temperature state, while passing through the evaporator 18. Thereafter, the outside air is changed to the high temperature state while passing through the condenser 12 and introduced into the interior of the vehicle, thereby smoothly heating and dehumidifying the interior of the vehicle.

Therefore, as described above, according to the heat pump system for a vehicle according to the embodiments of the present invention, it is possible to improve the cooling and heating performance by applying the gas injection device 50 selectively operating in at least one mode selected for air conditioning of the interior of the vehicle to increase the flow rate of the refrigerant.

In addition, according to embodiments of the present invention, it is possible to efficiently control the temperature of the battery module 3 selectively in at least one mode using one chiller 24 in which the coolant and the refrigerant are heat-exchanged.

In addition, according to embodiments of the present invention, it is possible to simplify the system by maximizing the system performance using the gas injection device 50 while minimizing components.

In addition, according to an embodiment of the present invention, by efficiently regulating the temperature of the battery module 3, it is possible to exhibit the optimal performance of the battery module 3, and by effectively managing the battery module 3, it is possible to increase the entire travel distance of the vehicle.

In addition, according to an exemplary embodiment of the present invention, it is possible to reduce the manufacturing cost, reduce the weight, and improve the space utilization by simplifying the entire system.

Although embodiments of the present disclosure have been described hereinabove with reference to exemplary embodiments and the drawings, the embodiments of the present disclosure are not limited thereto, but may be variously modified and altered by those skilled in the art to which the present disclosure pertains without departing from the spirit and scope of the embodiments of the present disclosure defined in the claims.

The following reference identifiers may be used in connection with the drawings to describe various features of embodiments of the present disclosure.

| | |
|---|---|
| 3: Battery module | 5: Coolant line |
| 10: Compressor | 11: Refrigerant line |
| 12: Condenser | 14: Heat exchanger |
| 16: First expansion valve | 18: Evaporator |
| 21: First refrigerant connection line | 24: Chiller |
| 26: Second expansion valve | 50: Gas injection device |
| 51: First gas-liquid separator | 52: Third expansion valve |
| 53: Fourth expansion valve | 54: Second refrigerant connection line |
| 55: Second gas-liquid separator | 56: Third refrigerant connection line |
| 57: Fifth expansion valve | 61: First line |
| 62: Second line | 63: Third line |
| V1, V2: First and second valves | |

What is claimed is:

1. A heat pump system for a vehicle, the system comprising:

a refrigerant line;

a compressor configured to compress a refrigerant;

a condenser connected to the compressor through the refrigerant line;

a heat exchanger connected to the condenser through the refrigerant line and configured to condense or evaporate the refrigerant;

a first expansion valve connected to the heat exchanger through the refrigerant line;

a first valve disposed on the refrigerant line between the heat exchanger and the first expansion valve;

an evaporator connected to the first expansion valve through the refrigerant line;

a first refrigerant connection line having a first end connected to the refrigerant line between the compressor and the evaporator and a second end connected to the refrigerant line between the heat exchanger and the first expansion valve;

a chiller disposed on the first refrigerant connection line and configured to control a temperature of a coolant by selectively exchanging heat between the refrigerant introduced into the first refrigerant connection line and the coolant;

a second expansion valve disposed on the first refrigerant connection line upstream of the chiller; and a gas injection device connected to the refrigerant line and configured to selectively expand and flow the refrigerant supplied from the condenser or the heat exchanger and to selectively supply a portion of the refrigerant to the compressor to increase a flow rate of the refrigerant circulating in the refrigerant line, wherein the flow of the refrigerant is controlled according to a mode for controlling a temperature of an interior of the vehicle or a temperature of a battery module, wherein the gas injection device comprises:

a first gas-liquid separator disposed on the refrigerant line between the condenser and the heat exchanger and configured to selectively separate the refrigerant into a gaseous refrigerant and a liquid refrigerant and to selectively discharge the gaseous refrigerant and the liquid refrigerant;

a second refrigerant connection line having a first end connected to the first gas-liquid separator and a second end connected to the first valve; and a second gas-liquid separator disposed on the second refrigerant connection line.

2. The system of claim 1, wherein the gas injection device further comprises:

a third expansion valve disposed on the refrigerant line between the condenser and the first gas-liquid separator;

a fourth expansion valve disposed on the refrigerant line between the first gas-liquid separator and the heat exchanger;

a third refrigerant connection line having a first end connected to the refrigerant line between the heat exchanger and the first valve and a second end connected to the second gas-liquid separator; and a fifth expansion valve disposed on the third refrigerant connection line.

3. The system of claim 2, wherein the gas injection device further comprises a first line configured to selectively supply the gaseous refrigerant discharged from the first gas-liquid separator or the second gas-liquid separator to the compressor, the first line having a first end connected to the second refrigerant connection line between the first gas-liquid separator and the second gas-liquid separator and a second end connected to the compressor.

4. The system of claim 3, wherein the first gas-liquid separator is configured to be operated in a state in which the third expansion valve expands and supplies the refrigerant while the interior of the vehicle is heated and supplies the gaseous refrigerant to the compressor through the first line to increase the flow rate of the refrigerant circulating in the refrigerant line.

5. The system of claim 3, wherein the second gas-liquid separator is configured to be operated in a state in which the fifth expansion valve expands and supplies the refrigerant while the interior of the vehicle is cooled and supplies the gaseous refrigerant to the compressor through the first line to increase the flow rate of the refrigerant circulating in the refrigerant line.

6. The system of claim 3, wherein the gas injection device further comprises a second line connecting between the third expansion valve and the fourth expansion valve and configured to selectively bypass the refrigerant supplied from the condenser to the heat exchanger without passing through the first gas-liquid separator according to an operation of the third expansion valve and the fourth expansion valve.

7. The system of claim 6, wherein the gas injection device further comprises:

a second valve disposed on the second refrigerant connection line between the first gas-liquid separator and the second gas-liquid separator; and a third line having a first end connected to the second valve and a second end connected to the refrigerant line between the evaporator and the compressor.

8. The system of claim 7, wherein the mode is selected from a plurality of modes comprising:

a first mode in which the gas injection device is operated and the battery module is cooled while the interior of the vehicle is cooled;

a second mode in which the gas injection device is operated and the interior of the vehicle is heated;

a third mode in which the gas injection device is not operated and the battery module is cooled while the interior of the vehicle is cooled;

a fourth mode in which the gas injection device is not operated and the interior of the vehicle is heated; and a fifth mode in which the interior of the vehicle is heated and dehumidified.

9. The system of claim 8, wherein, in a case in which the mode is the first mode:

the first refrigerant connection line is configured to be opened by an operation of the second expansion valve;

the second refrigerant connection line is configured to be opened by an operation of the first valve;

the third refrigerant connection line is configured to be opened by an operation of the fifth expansion valve;

a portion of the refrigerant line connecting the third refrigerant connection line and the first valve is configured to be closed by an operation of the first valve;

the first line is configured to be opened by an operation of the second valve;

the second line is configured to be opened by an operation of the third expansion valve and the fourth expansion valve;

the third line is configured to be closed by the operation of the second valve;

the refrigerant line connecting the third expansion valve, the first gas-liquid separator, and the fourth expansion valve is configured to be closed by the operation of the third expansion valve and the fourth expansion valve;

the first expansion valve is configured to expand the refrigerant introduced from the second gas-liquid separator along the refrigerant line and supply the expanded refrigerant to the evaporator;

the second expansion valve is configured to expand the refrigerant introduced into the first refrigerant connection line and supply the expanded refrigerant to the chiller;

the third expansion valve is configured to allow the refrigerant supplied from the condenser to flow into the second line without expanding the refrigerant;

the fourth expansion valve is configured to allow the refrigerant supplied through the second line to flow into the heat exchanger without expanding the refrigerant;

the fifth expansion valve is configured to expand the refrigerant introduced from the heat exchanger through the third refrigerant connection line and supply the expanded refrigerant to the second gas-liquid separator; and the second gas-liquid separator is configured to supply the gaseous refrigerant supplied through the third refrigerant connection line to the compressor through the opened second refrigerant connection line and the first line and to discharge the liquid refrigerant to the refrigerant line through the first valve.

10. The system of claim 8, wherein, in a case in which the mode is the second mode:

the first refrigerant connection line is configured to be closed by an operation of the second expansion valve;

the second refrigerant connection line has a portion connecting the first gas-liquid separator and the first line and a portion connecting the second gas-liquid separator and the third line configured to be opened;

the third refrigerant connection line is configured to be opened by an operation of the fifth expansion valve;

the refrigerant line connecting the evaporator from a rear end of the heat exchanger with respect to the third refrigerant connection line is configured to be closed;

the first line is configured to be opened;

the second line is configured to be closed by the operation of the third expansion valve and the fourth expansion valve;

the third line is configured to be opened by an operation of the second valve;

the refrigerant line connecting the third expansion valve, the first gas-liquid separator, and the fourth expansion valve is configured to be opened by the operation of the third expansion valve and the fourth expansion valve;

an operation of the first expansion valve and the second expansion valve stops;

the third expansion valve is configured to expand the refrigerant supplied from the condenser and supply the expanded refrigerant to the first gas-liquid separator;

the fourth expansion valve is configured to expand the refrigerant supplied from the first gas-liquid separator and supply the expanded refrigerant to the heat exchanger;

the fifth expansion valve is configured to supply the refrigerant introduced from the heat exchanger through the third refrigerant connection line to the second gas-liquid separator without expanding the refrigerant;

the first gas-liquid separator is configured to supply the gaseous refrigerant to the compressor through the opened first line; and the second gas-liquid separator is configured to supply the gaseous refrigerant supplied through the third refrigerant connection line to the compressor through the opened third line.

11. The system of claim 8, wherein, in a case in which the mode is the third mode:

the first refrigerant connection line is configured to be opened by an operation of the second expansion valve;

the second refrigerant connection line is configured to be closed by an operation of the first valve;

the third refrigerant connection line is configured to be closed by an operation of the fifth expansion valve;

the first line is configured to be closed;

the second line is configured to be opened by the operation of the third expansion valve and the fourth expansion valve;

the third line is configured to be closed by the operation of the second valve;

the refrigerant line connecting the third expansion valve, the first gas-liquid separator, and the fourth expansion valve is configured to be closed by the operation of the third expansion valve and the fourth expansion valve;

the first expansion valve is configured to expand the refrigerant introduced from the heat exchanger along the refrigerant line and supply the expanded refrigerant to the evaporator;

the second expansion valve is configured to expand the refrigerant introduced into the first refrigerant connection line and supply the expanded refrigerant to the chiller;

the third expansion valve is configured to allow the refrigerant supplied from the condenser to flow into the second line without expanding the refrigerant;

the fourth expansion valve is configured to allow the refrigerant supplied through the second line to flow into the heat exchanger without expanding the refrigerant; and the operation of the fifth expansion valve stops.

12. The system of claim 8, wherein, in a case in which the mode is the fourth mode:

the first refrigerant connection line is configured to be closed by an operation of the second expansion valve;

a portion of the second refrigerant connection line connecting the second gas-liquid separator and the third line is configured to be opened by an operation of the second valve;

the third refrigerant connection line is configured to be opened by an operation of the fifth expansion valve;

the refrigerant line connecting the evaporator from a rear end of the heat exchanger with respect to the third refrigerant connection line is configured to be closed;

the first line is configured to be closed;

the second line is configured to be opened by the operation of the third expansion valve and the fourth expansion valve;

the third line is configured to be opened by an operation of the second valve;

the refrigerant line connecting the third expansion valve, the first gas-liquid separator, and the fourth expansion valve is configured to be closed by the operation of the third expansion valve and the fourth expansion valve;

the operation of the first expansion valve and the second expansion valve stops;

the third expansion valve is configured to allow the refrigerant supplied from the condenser to flow into the second line without expanding the refrigerant;

the fourth expansion valve is configured to expand the refrigerant supplied through the second line and allow the expanded refrigerant to flow into the heat exchanger;

the fifth expansion valve is configured to supply the refrigerant introduced into the third refrigerant connection line to the second gas-liquid separator without expanding the refrigerant; and the second gas-liquid separator is configured to supply the gaseous refrigerant supplied through the third refrigerant connection line to the compressor through the opened third line.

13. The system of claim 8, wherein, in a case in which the mode is the fifth mode:

the first refrigerant connection line is configured to be closed by an operation of the second expansion valve;

a portion of the second refrigerant connection line connecting the second gas-liquid separator and the third line is configured to be opened by an operation of the second valve;

the third refrigerant connection line is configured to be opened by an operation of the fifth expansion valve;

the refrigerant line connecting the evaporator from a rear end of the heat exchanger with respect to the third refrigerant connection line is configured to be opened by an operation of the first valve and the first expansion valve;

the first line is configured to be closed;

the second line is configured to be opened by the operation of the third expansion valve and the fourth expansion valve;

the third line is configured to be opened by an operation of the second valve;

the refrigerant line connecting the third expansion valve, the first gas-liquid separator, and the fourth expansion valve is configured to be closed by the operation of the third expansion valve and the fourth expansion valve;

the first expansion valve is configured to selectively expand the refrigerant supplied from the heat exchanger and supply the expanded refrigerant to the evaporator;

an operation of the second expansion valve stops;

the third expansion valve is configured to allow the refrigerant supplied from the condenser to flow into the second line without expanding the refrigerant;

the fourth expansion valve is configured to expand the refrigerant supplied through the second line and allow the expanded refrigerant to flow into the heat exchanger;

the fifth expansion valve is configured to supply the refrigerant introduced into the third refrigerant connection line to the second gas-liquid separator without expanding the refrigerant; and the second gas-liquid separator is configured to supply the gaseous refrigerant supplied through the third refrigerant connection line to the compressor through the opened third line.

14. The system of claim 8, wherein the heat exchanger is configured to condense the refrigerant in the first mode and the third mode.

15. The system of claim 8, wherein the heat exchanger is configured to evaporate the refrigerant in the second mode, the fourth mode, and the fifth mode.

16. The system of claim 2, wherein the first expansion valve, the second expansion valve, and the fifth expansion valve comprise 2-way expansion valves that are configured to be selectively operated in the mode and to selectively expand the refrigerant while controlling the flow of the refrigerant.

17. The system of claim 2, wherein the third expansion valve and the fourth expansion valve comprise 3-way electronic expansion valves that are configured to be selectively operated in the mode and to selectively expand the refrigerant while controlling the flow of the refrigerant.

18. A heat pump system for a vehicle, the system comprising:
a refrigerant line;
a compressor configured to compress a refrigerant;
a condenser connected to the compressor through the refrigerant line;

a heat exchanger connected to the condenser through the refrigerant line and configured to condense or evaporate the refrigerant;

a first expansion valve connected to the heat exchanger through the refrigerant line;

an evaporator connected to the first expansion valve through the refrigerant line;

a first refrigerant connection line having a first end connected to the refrigerant line between the compressor and the evaporator and a second end connected to the refrigerant line between the heat exchanger and the first expansion valve;

a chiller disposed on the first refrigerant connection line and configured to control a temperature of a coolant by selectively exchanging heat between the refrigerant introduced into the first refrigerant connection line and the coolant;

a second expansion valve disposed on the first refrigerant connection line upstream of the chiller; and a gas injection device connected to the refrigerant line and configured to selectively expand and flow the refrigerant supplied from the condenser or the heat exchanger and to selectively supply a portion of the refrigerant to the compressor to increase a flow rate of the refrigerant circulating in the refrigerant line, wherein the flow of the refrigerant is controlled according to a mode for controlling a temperature of an interior of the vehicle or a temperature of a battery module, and wherein the chiller is connected to the battery module through a coolant line configured to allow the coolant to circulate therethrough, wherein, in a state of cooling the battery module, the coolant line is in an open state to connect the chiller and the battery module.

19. A heat pump system for a vehicle, the system comprising:
a refrigerant line;
a compressor configured to compress a refrigerant;
a condenser connected to the compressor through the refrigerant line;
a heat exchanger connected to the condenser through the refrigerant line and configured to condense or evaporate the refrigerant;
a first expansion valve connected to the heat exchanger through the refrigerant line;
a first valve disposed on the refrigerant line between the heat exchanger and the first expansion valve;
an evaporator connected to the first expansion valve through the refrigerant line;
a first refrigerant connection line having a first end connected to the refrigerant line between the compressor and the evaporator and a second end connected to the refrigerant line between the heat exchanger and the first expansion valve;
a chiller disposed on the first refrigerant connection line and configured to control a temperature of a coolant by selectively exchanging heat between the refrigerant introduced into the first refrigerant connection line and the coolant;
a second expansion valve disposed on the first refrigerant connection line upstream of the chiller; and
a gas injection device connected to the refrigerant line and configured to selectively expand and flow the refrigerant supplied from the condenser or the heat exchanger and to selectively supply a portion of the refrigerant to the compressor to increase a flow rate of the refrigerant circulating in the refrigerant line, wherein the flow of the refrigerant is controlled according to a mode for controlling a temperature of an interior of the vehicle or a temperature of a battery module, wherein the gas injection device comprises:

a first gas-liquid separator disposed on the refrigerant line between the condenser and the heat exchanger and configured to selectively separate the refrigerant into a gaseous refrigerant and a liquid refrigerant and to selectively discharge the gaseous refrigerant and the liquid refrigerant;

a third expansion valve disposed on the refrigerant line between the condenser and the first gas-liquid separator;

a fourth expansion valve disposed on the refrigerant line between the first gas-liquid separator and the heat exchanger;

a second refrigerant connection line having a first end connected to the first gas-liquid separator and a second end connected to the first valve and the first expansion valve;

a second gas-liquid separator disposed on the second refrigerant connection line;

a third refrigerant connection line having a first end connected to the refrigerant line between the heat exchanger and the first valve and a second end connected to the second gas-liquid separator; and a fifth expansion valve disposed on the third refrigerant connection line;

wherein the first expansion valve, the second expansion valve, and the fifth expansion valve comprise 2-way expansion valves that are configured to be selectively operated in the mode and to selectively expand the refrigerant while controlling the flow of the refrigerant; and wherein the third expansion valve and the fourth expansion valve comprise 3-way electronic expansion valves that are configured to be selectively operated in the mode and to selectively expand the refrigerant while controlling the flow of the refrigerant.

20. The system of claim 19, wherein the gas injection device further comprises a first line configured to selectively supply the gaseous refrigerant discharged from the first gas-liquid separator or the second gas-liquid separator to the compressor, the first line having a first end connected to the second refrigerant connection line between the first gas-liquid separator and the second gas-liquid separator and a second end connected to the compressor.

* * * * *